Patented Jan. 8, 1929.

1,698,622

UNITED STATES PATENT OFFICE.

LEO P. CURTIN, OF FREEHOLD, NEW JERSEY, ASSIGNOR TO THE WESTERN UNION TELEGRAPH COMPANY, OF NEW YORK, N. Y., A CORPORATION OF NEW YORK.

METHOD OF TREATING WOOD.

No Drawing. Application filed April 16, 1927. Serial No. 184,445.

This invention relates to the art of treating wood, fabrics and other cellulosic materials for the primary purpose of rendering them non-flammable of incapable of supporting combustion, the treatment serving also to increase greatly the resistance of the material to fungus or insect attack. I accomplish these results by impregnating the cellulosic material with aqueous solutions containing ammonium arsenite, or ammonium-arsenic combinations or salts equivalent to ammonium arsenite for the purposes described.

Fire retardants as heretofore used for the impregnation of timber have comprised either (1) substances which in the presence of heat volatilize, blanketing the combustible material with inert gas or vapor; or (2) materials which fuse at low temperatures, protecting the combustible substance with a layer of fused salt or an aqueous solution.

Ammonium arsenite, and also arsenous oxide, $As_2O_3$ deposited therefrom, belongs to the first of these groups. My investigations have shown that the deposit from the spontaneous evaporation of ammonaical solutions of arsenous acid, even though a substantial excess of ammonia is initially present above the equi-molecular proportion corresponding to ammonium meta-arsenite $NH_4AsO_2$, is substantially arsenous oxid. Hence the fire-resistant character of the wood treated in accordance with my invention is attributable to this substance. I have found that the vapors of arsenous oxid, which volatilizes at moderate temperatures, about 218° C., are highly effective for blanketing purposes, presumably owing to their high density and consequently low diffusion rate.

Solutions of arsenous acid can be prepared by the direct action of water on arsenous oxid, but only with great difficulty, owing to the non-wetting characteristics of this oxid. The presence of dissolved bases, even in relatively small proportions, greatly improves this condition: and I have discovered that ammonia is extremely effective for this purpose, not only with respect to the ease of formation of the arsenical solution, but also to the penetrative qualities of the resulting solutions.

It is not necessary that the proportion of ammonia used should be sufficient for the formation of the meta-arsenite $NH_4AsO_2$. I have found for example that at 30° C., 100 cc. of water containing 2.8 grams of $NH_3$ will hold in solution 20.5 grams of $As_2O_3$, which illustrates the possibility of obtaining very high concentrations of arsenic in these solutions. Under the same temperature conditions zinc meta-arsenite solutions are limited to about 2.5 grams of arsenous oxid, and barium hydroxid-arsenous oxid solutions to about 4 grams. Hence where relatively high concentrations are desired, as in fire-proofing, the ammoniacal solutions are far superior. For fire-proofing purposes it is generally desired to use solutions containing from 5 to 10% of arsenic, and the employment of ammonia permits this to be accomplished without using heated solutions.

Furthermore, these solutions possess remarkable penetrant power for wood, being in this respect greatly superior to zinc chlorid solutions or to arsenical solutions containing other bases. For example it is possible to saturate the most resinous long-leaf pine heart wood by simply soaking in the cold solution. It also penetrates Douglas fir and other difficultly treatable Western woods. An excess of ammonia above the equi-molecular proportion to the arsenic facilitates the penetration but is not essential to the invention. As a rule, I prefer to provide, in these treating solutions, a ratio of $NH_3$ : As which is higher than 1 : 3.

Woods and other materials treated as hereindescribed are highly resistant to insect and fungous attack. In respect to protection from the wood-rotting fungus, Fomes annosus, arsenous oxid is equal to mercuric chlorid, and far superior to other commonly used impregnating solutions, as indicated below:

| | Killing point, Fomes annosus. |
|---|---|
| Zinc chlorid | .35% |
| Sodium fluorid | .25% |
| Mercuric chlorid | .015% |
| Arsenous oxid | .015% |

As will be apparent from the above, where protection from fungus attack is the main consideration, solutions of relatively very low concentration are effective. Hence this invention is not restricted to the employment of the more concentrated solutions mentioned above, but covers broadly the treatment of cellulosic materials with ammoniacal solutions of arsenous acid.

These solutions also emulsify well with petroleum oils and distillates, and other hydrocarbons, and the invention contemplates applying them in the form of such emulsions, the effect of which is to render the wood resistant to the penetration of water. In such case the arsenous acid serves to counteract, wholly or in part, the flammability which the oil would otherwise impart.

The expression "arsenous oxid in ammoniacal solution" is used herein to include broadly aqueous solutions containing arsenous oxid or arsenous acid and ammonia, irrespective of the relative proportions of these materials or their state of chemical combination with each other.

As a specific example, I may mention that a roof of red cedar shingles, impregnated with this solution of a concentration corresponding to about 8 oz. of $As_2O_3$ per cubic foot of treated wood, proved to be incapable of supporting combustion, although charred and destroyed by heat from untreated wood. Higher concentrations, up to 1 lb. or more of arsenous oxid per cubic foot of treated wood are even more effective. On account of the relatively low solubility and rate of solution of arsenous oxid in water, the impregnation is substantially permanent, and well-suited for such outside applications as shingles, siding, freight cars, railroad ties, poles, posts, bridge timbers and the like.

I claim:

1. Method of preserving cellulosic material which comprises impregnating the same with a solution containing arsenous acid and ammonia, said solution being capable of depositing free arsenous oxid upon exposure to air.

2. Method of preserving cellulosic material which comprises impregnating the same with a solution containing arsenous acid and ammonia, said solution containing upward of 5% of arsenous acid and being capable of depositing free arsenous oxid upon exposure to air.

3. Method of preserving cellulosic material which comprises impregnating the same with an emulsion containing a liquid hydrocarbon and an aqueous solution containing arsenous acid and ammonia, said aqueous solution being capable of depositing free arsenous oxid upon exposure to air.

In testimony whereof, I affix my signature.

LEO P. CURTIN.